(12) United States Patent
Jiang et al.

(10) Patent No.: US 12,183,031 B2
(45) Date of Patent: Dec. 31, 2024

(54) DETERMINING POSITIONS OF SERVER COMPUTERS WITHIN RACKS

(71) Applicant: Super Micro Computer, Inc., San Jose, CA (US)

(72) Inventors: Tsang Ming Jiang, Taoyuan (TW); Shu-Chun Yeh, Taoyuan (TW)

(73) Assignee: Super Micro Computer, Inc., San Jose, CA (US)

( * ) Notice: Subject to any disclaimer, the term of this patent is extended or adjusted under 35 U.S.C. 154(b) by 146 days.

(21) Appl. No.: 18/173,302

(22) Filed: Feb. 23, 2023

(65) Prior Publication Data

US 2024/0289980 A1    Aug. 29, 2024

(51) Int. Cl.
*G06F 3/06* (2006.01)
*G06T 7/73* (2017.01)
*G08B 5/36* (2006.01)

(52) U.S. Cl.
CPC ............... *G06T 7/73* (2017.01); *G08B 5/36* (2013.01); *G06T 2207/10016* (2013.01)

(58) Field of Classification Search
CPC .... G06T 7/73; G06T 2207/10016; G08B 5/36
See application file for complete search history.

(56) References Cited

U.S. PATENT DOCUMENTS

| | | | | |
|---|---|---|---|---|
| 9,361,716 | B1 * | 6/2016 | Erikson | G06T 11/60 |
| 2004/0172155 | A1 * | 9/2004 | Abe | G11B 33/126 |
| | | | | 700/214 |
| 2013/0111495 | A1 * | 5/2013 | Blanck | G06F 9/5094 |
| | | | | 718/105 |
| 2017/0006410 | A1 * | 1/2017 | Barrett | H04W 4/023 |
| 2017/0006576 | A1 * | 1/2017 | Barrett | H04W 64/003 |
| 2017/0247108 | A1 * | 8/2017 | Ljubuncic | H04W 68/005 |
| 2017/0263016 | A1 * | 9/2017 | Nodera | G06T 7/62 |
| 2018/0109083 | A1 * | 4/2018 | Fenker | G06F 30/39 |
| 2023/0403812 | A1 * | 12/2023 | Cheung | H05K 7/1492 |

OTHER PUBLICATIONS

"19-inch rack", Wikipedia, https://en.wikipedia.org/wiki/19-inch_rack, downloaded Jan. 27, 2023.
"Rack unit", Wikipedia, https://en.wikipedia.org/wiki/Rack_unit#cite_note-1, downloaded Jan. 27, 2023.
"SuperCloud Composer", https://www.supermicro.com/en/solutions/management-software/supercloud-composer, downloaded Feb. 13, 2023.
"System Management Software", https://www.supermicro.com/en/solutions/management-software, downloaded Feb. 13, 2023.

* cited by examiner

*Primary Examiner* — Howard D Brown, Jr.
(74) *Attorney, Agent, or Firm* — Beyer Law Group LLP (57) ABSTRACT

System and methods for determining positions of server computers within a rack are disclosed. Unit Identification (UID) lights of the server computers are turned ON to determine positions of server computers relative to other server computers or relative to other server computers and non-server levels. The non-server levels include empty levels and levels with equipment that are not server computers. The positions of server computers are identified based on images of the servers captured by a camera or by polling the states of the UID lights.

10 Claims, 6 Drawing Sheets

DETERMINING POSITIONS OF SERVER COMPUTERS WITHIN RACKS

TECHNICAL FIELD

The present disclosure is generally directed to rack-mounted server computers, and more particularly to determining the positions of server computers within racks.

BACKGROUND

Data centers have server computers ("servers") that are mounted in racks. A typical rack for servers has several levels, with each level being configured to accept a server or other electronic equipment. A rack unit is a measure of the height of a piece of equipment that can be mounted in the rack. For example, for a standard 19-inch or 23-inch rack, one rack unit (i.e., 1 U) is defined as 1.75 inches.

Racks employed in data centers can each have as much as 42 rack units. This means that each rack can accommodate 42 1 U servers. Because a server does not have to be mounted in a particular level on a rack, keeping track of server positions in multi-rack data centers is relatively difficult and error-prone.

BRIEF SUMMARY

In one embodiment, a method of determining positions of server computers within a rack includes sending electronic signals to poll the server computers for states of corresponding Unit Identification (UID) lights of the server computers. The UID lights of the server computers are sequentially activated. Polling responses that indicate the states of the UID lights are received from the server computers. The polling responses are analyzed to correlate the sequential activation of the UID lights to positions of the server computers in the rack.

In another embodiment, a method of determining positions of server computers within a rack includes using a camera to capture images of the rack. UID lights of the server computers are turned OFF. An electronic signal is sent to a server computer to turn ON a UID light of the server computer. The server computer is set to a topmost position in the rack. An electronic signal is sent to another server computer to turn ON a UID light of the other server computer. Image signals from the camera are programmatically processed to detect the turning ON of the UID light of the other server computer to determine a position of the other server computer relative to server computers in the rack. When the other server computer is above all known server computers, the other server computer is set to the topmost position and positions of all known server computers are incremented. When the other server computer is below all known server computers, the other server computer is set to a bottom most position in the rack. When the other server computer is between two consecutive known server computers, the other server computer is set to a position that is equal to a position of a lower server sever computer among the two consecutive known server computers, and the positions of all known server computers that are below the other server computer are incremented.

In yet another embodiment, a system for determining positions of server computers within a rack includes a camera and a server management computer. The camera is positioned in front of the rack. The server management computer includes at least one processor and a memory, the memory storing instructions that when executed by the at least one processor cause the server management computer to: receive image signals from the camera; turn OFF UID lights of the server computers; send an electronic signal to a server computer to turn ON a UID light of the server computer; set the server computer to a topmost position in the rack; send an electronic signal to another server computer to turn ON a UID light of the other server computer; process the image signals received from the camera to detect the turning ON of the UID light of the other server computer to determine a position of the other server computer relative to server computers in the rack; when the other server computer is above all known server computers in the rack, set the other server computer to the topmost position and increment positions of all known server computers; when the other server computer is below all known server computers, set the other server computer to a bottom most position in the rack; and when the other server computer is between two consecutive known server computers, set the other server computer to a position that is equal to a position of a lower server computer among the two consecutive known server computers, and increment positions of all known server computers that are below the other server computer.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures. The figures are not drawn to scale.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
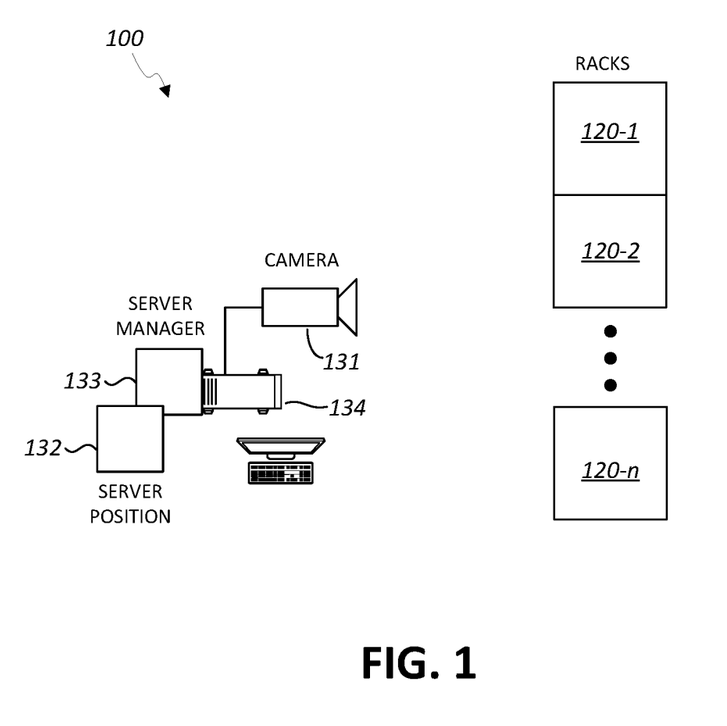
FIG. 1 shows a schematic top view of a data center in accordance with an embodiment of the present invention.

FIG. 1 shows a schematic top view of a data center 100 in accordance with an embodiment of the present invention. In the example of FIG. 1, the data center has a plurality of racks 120 (i.e., 120-1, 120-2, ..., 120-n), with each rack 120 being able to accommodate a plurality of server computers. A server computer, which is also simply referred to herein as a "server", is a hardware device with at least one processor, memory, and other hardware components. The data center 100 includes a server management computer 134 and a camera 131. In one embodiment, the server management computer 134 and the camera 131 form a system for determining positions of servers mounted in the racks 120.

The camera 131 may be a dedicated camera for discovering server positions, a surveillance camera, or other suitable imaging device that takes images of the racks 120 and the servers mounted therein. The camera 131 may be connected to the server management computer 134 by wireless (e.g., WiFi) or wired (e.g., Ethernet, Universal Serial Bus) connection. The viewing angle of the camera 131 faces toward the front sides of the racks 120, i.e., the front sides of the servers mounted in the racks 120. Components of the data center 100 that are not relevant to the present invention, such as gateways, routers, switches, etc., are not shown for clarity of illustration.

The server management computer 134 may comprise a desktop, laptop, workstation, or other computing device for managing servers of the data center 100. The server management computer 134 hosts a server manager 133, which comprises server management software. The server manager 133 may be the Supermicro Server Manager (SSM) software, the Supermicro SuperCloud Composer software, or other suitable commercially-available server management software.

The server manager 133 may communicate with servers in the data center 100 over Ethernet or other computer network. Each server managed by the server manager 133 has a corresponding server identifier (e.g., server name, numeric identifier, alphanumeric identifier). The server manager 133 may address or communicate with a particular server by referencing its server identifier. The server manager 133 may activate, deactivate, or check the state of a UID light of a server by sending a corresponding electronic signal (e.g., data transmitted over a computer network) to the server. The server manager 133 may maintain a record of each managed server, including the server's server identifier, the rack where the server is installed, the position of the server in the rack, etc.

In the example of FIG. 1, the server manager 133 includes a server position module 132, which is configured to determine the positions of the servers within the racks 120. The server position module 132 can perform actions available to the server manager 133. As can be appreciated, the functionality of the server position module 132 may also be incorporated in software other than the server manager 133 or implemented as a stand-alone software. Currently-available server management software may be modified to include the functionality of the server position module 132 as disclosed herein.

The server position module 132 may receive image signals from the camera 131. In one embodiment, the image signals comprise video of the racks 120 and servers mounted therein. The server position module 132 may include a conventional image processing algorithm for programmatically (i.e., automatic by program code) processing the video to determine or identify a perimeter of a rack 120, servers mounted in the rack 120, the state of Unit Identification (UID) lights of the servers mounted in the rack 120, non-server equipment and empty levels in the rack 120, the last UID light that has been turned ON, etc. As can be appreciated, image processing tasks discussed herein are well understood in the art of image processing and accordingly not further described.

In one embodiment, a UID light is a lighted push button, also referred to as "UID button" or "UID LED". Generally, manually activating the UID light on the front of the server turns ON the UID light and a corresponding light on the back of the server. This allows an Information Technology (IT) person to identify the server from the back of the rack. The server manager 133, and thus the server position module 132, can also turn the UID light ON or OFF by sending corresponding electronic signals to the server, such as by sending a message or data over a computer network that connects the server management computer 134 to the servers.

The server position module 132 is configured to control the state of the UID lights, receive video of the servers mounted in the racks, and identify from the video which UID lights are in the ON state or OFF state. By controlling the state of the UID lights in a proper sequence and analyzing the corresponding video signals, the server position module 132 may determine the positions of the servers within the rack as described herein.

Figure 2:
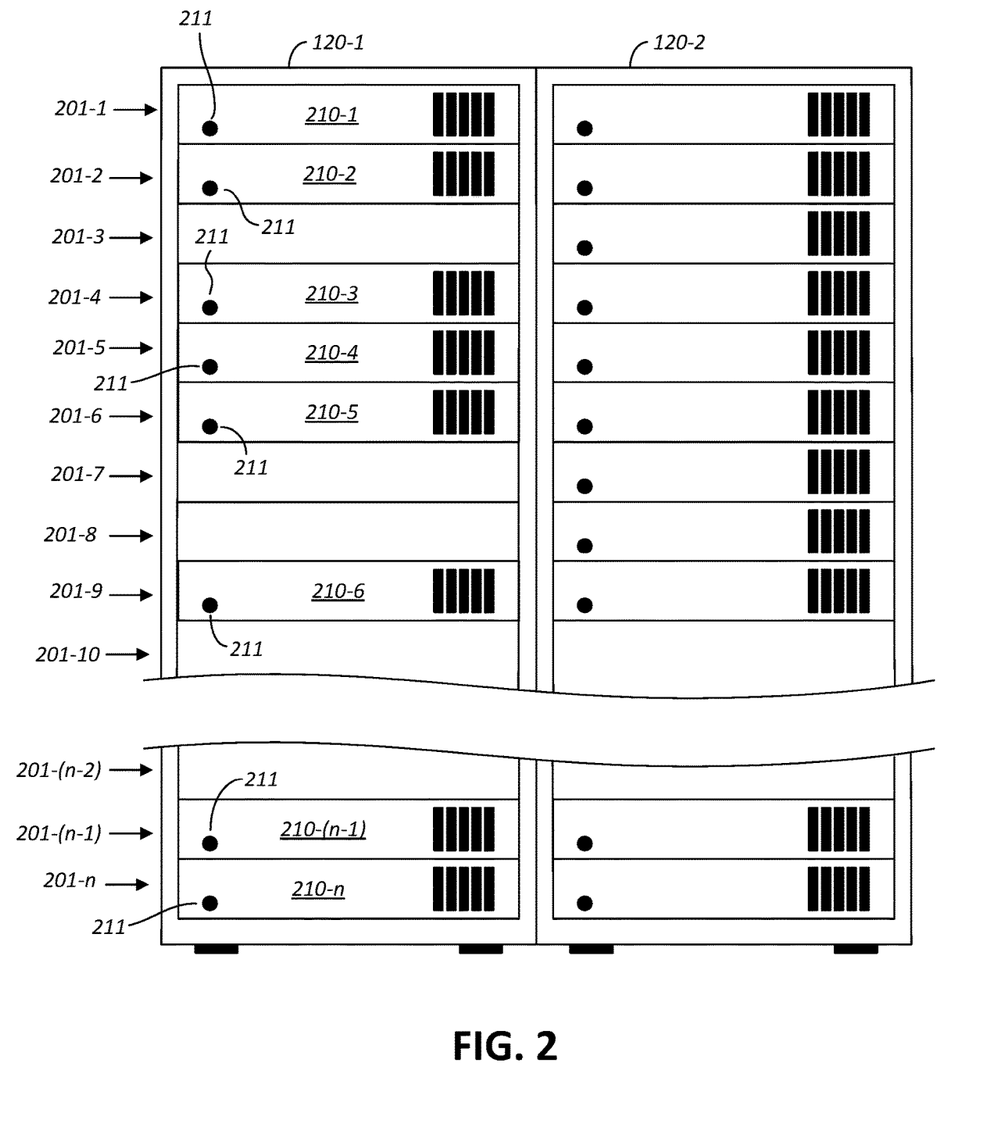
FIG. 2 shows a schematic front view of the racks of FIG. 1 in accordance with an embodiment of the present invention.

FIG. 2 shows a schematic front view of the racks 120 in accordance with an embodiment of the present invention. FIG. 2 only shows racks 120-1 and 120-2 for clarity of illustration. Each rack 120 has a plurality of levels 201 (i.e., 201-1, 201-2, 102-3, ..., 102-n), with the topmost level being 201-1 and the bottom most level being 201-n. In one embodiment, each level 201 corresponds to one rack unit (1 U). Each rack 120 can accept a number of servers 210 (i.e., 210-1, 210-2, 210-3, ..., 210-n) depending on the capacity of the rack and the size of the servers. A server 210 may be a rackmount server from Super Micro, Inc. or other server vendor.

In the example of FIG. 2, each server 210 is a one rack unit (1 U) server and occupies one level 201. As can be appreciated, servers come in a variety of rack unit sizes. For example, a four rack unit (4 U) server will occupy four levels 201. Embodiments of the present invention are suitable to servers of different rack unit sizes. Each server 210 has a corresponding UID light 211, which in one embodiment is an illuminated push button. A UID light 211 may be activated or deactivated by manually pushing the UID light 211 or by sending corresponding electronic signals to the server 210.

A rack 120 is not necessarily filled to capacity. For example, the rack 120-1 is depicted as having no servers 210 on levels 201-3, 201-7, 201-8, 201-10, and 201-(n−2). A non-server level is a level that is empty or occupied by non-server equipment. For purposes of the present disclosure, non-server equipment include equipment that are not servers (e.g., switches, routers, drive bays, power supplies) and un-managed servers (i.e., servers that are not managed by the server manager 133).

Figure 3:
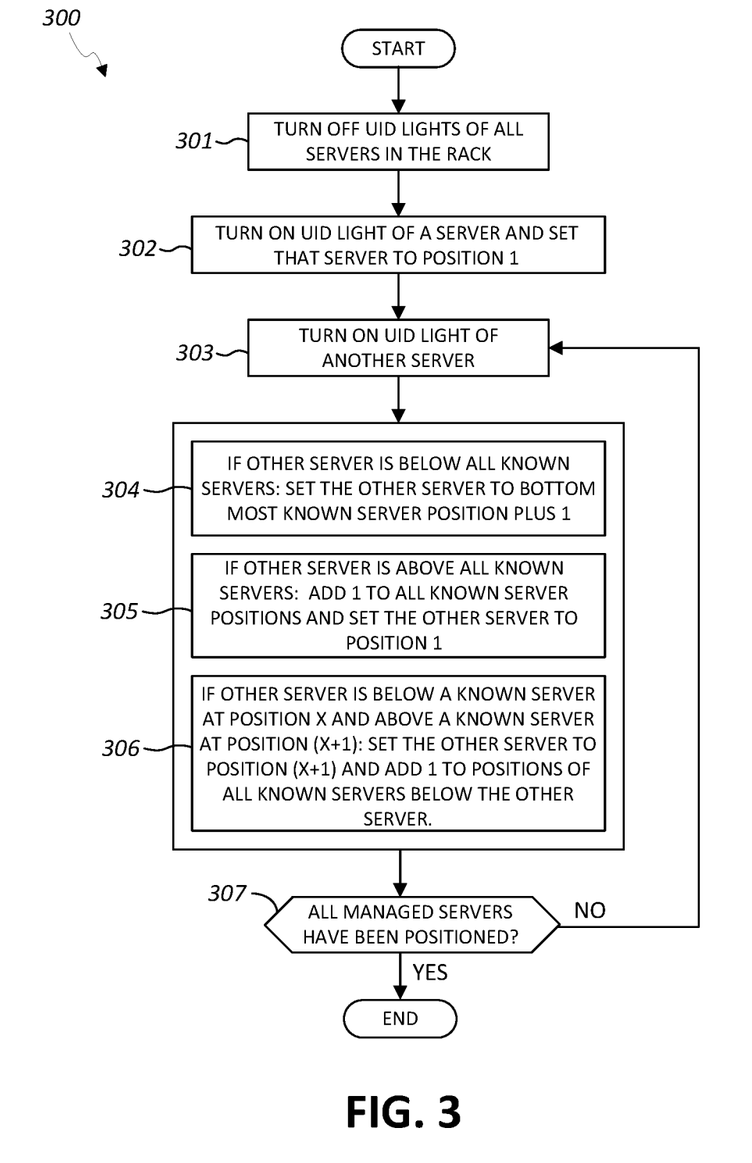
FIG. 3 shows a flow diagram of a method of determining positions of servers within a rack in accordance with an embodiment of the present invent.

FIG. 3 shows a flow diagram of a method 300 of determining positions of servers within a rack in accordance with an embodiment of the present invent. The method 300 is a relative positioning method in that it determines a position of a server relative to other servers mounted in the same rack.

In one embodiment, the method 300 is performed by the server position module 132 of the server manager 133. In the following steps, the server position module 132 sends an electronic signal to a server to turn that server's UID light ON or OFF. The server position module 132 receives image signals (e.g., video) of a rack and servers mounted in the rack from a camera, and determines, from the image signals, the state (i.e., either ON or OFF) of UID lights of the servers. A UID light is typically in a known general location on a front of a server and is bright when turned ON, allowing the UID light to be readily distinguished from other features in a rack. The last UID light that has been turned ON may be identified by comparing consecutive images. This allows for determination of whether the last turned ON UID light is above all UID lights, below all UID lights, or between two consecutive UID lights.

In step 301, the method 300 begins by turning OFF the UID lights of all servers that are mounted in a rack. Because un-managed servers are not controllable by the server position module 132, the UID lights of un-managed servers may be manually turned OFF. A UID light that has been turned ON at any of the following steps remains ON until the end of the method 300.

In step 302, a UID light of a first server is turned ON, and the first server is set to position 1. In one embodiment, position 1 is a topmost position in the rack. The topmost server is at position 1, the next server immediately below the topmost server is at position 2, the next server immediately below the server at position 2 is at position 3, and so on. That is, the servers are being arranged in sequential order from top to bottom as being at positions 1, 2, 3, etc.

In step 303, a UID light of a second server is turned ON. The position of the second server depends on the position of the second server relative to servers that have already been set to corresponding positions by the method 300, which are also referred to herein as "known servers". Step 304 is the case where the second server is found to be the bottom most server, step 305 is the case where the second server is found to be the topmost server, and step 306 is the case where the second server is found to be between two consecutive known servers.

In step 304, if the second server is below all known servers, the second server is set to the bottom most known server position plus one. As an example, if the bottom most known server is at position 20, the second server is set to position 21. In the case of step 304, the second server becomes the bottom most server.

In step 305, if the second server is above all known servers: (a) one is added to all known server positions; and (b) the second server is set to position 1. As an example, if a particular server is at position 1, the next particular server is at position 2, etc.: the second server is set to position 1; the particular server previously at position 1 is now set to position 2; the next particular server previously at position 2 is now set to position 3; etc. In the case of step 305, the second server becomes the topmost server, and the positions of all known servers below the second server are incremented.

In step 306, if the second server is below a known server at position X and above a known server at position (X+1): (a) the second server is set to position (X+1); and (b) one is added to the positions of all known servers below the second server. As an example, if the second server is found to be between a known server at position 10 and a known server at position 11: the second server is set to position 11; the server previously at position 11 is now set to position 12; the server previously at position 12 is now set to position 13, etc. In the case of step 306, the second server is found to be between two known consecutive servers and, consequently, (a) the position of the second server becomes equal to the lower of the two known consecutive servers and (b) the positions of all known servers below the second server are incremented.

In step 307, the steps 303-306 are repeated until all managed servers in the rack have been positioned. As can be appreciated, the server manager 133 keeps track of all the servers that are managed by the server manager 133. For a given rack, the method 300 ends when all of the servers managed by the server manager 133 have been set to positions in the rack. At the end of the method 300, the UID lights of all the servers mounted in the rack may be turned OFF to resume normal operation.

The method 300 is a relative positioning method in that it determines a position of a server relative to other servers mounted in the same rack. In some data centers, it is desirable to determine the absolute position of a server in the rack. Determining the absolute position of a server involves taking into account not just the position of other servers, but also positions of non-server levels in the rack.

Figure 4:
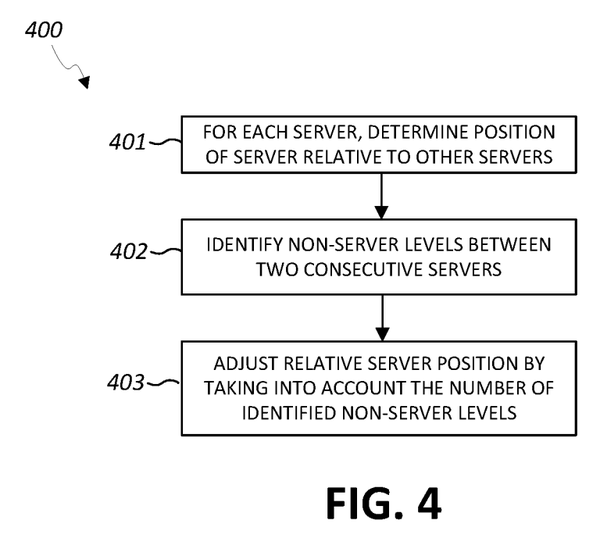
FIG. 4 shows a flow diagram of a method of determining positions of servers within a rack in accordance with another embodiment of the present invent.

FIG. 4 shows a flow diagram of a method 400 of determining positions of servers within a rack in accordance with an embodiment of the present invent. The method 400 is an absolute positioning method in that it determines the position of a server relative to other servers and non-server levels in the same rack.

In one embodiment, the method 400 is performed by the server position module 132 of the server manager 133. In the following steps, the server position module 132 sends electronic signals to a server to turn that server's UID light ON or OFF. The server position module 132 receives image signals of a rack and servers mounted in the rack from a camera, and determines, from the image signals, the state of UID lights of the servers. The server position module 132 also identifies, from the image signals, servers and non-server levels in the rack.

In step 401, the method 400 begins by determining the positions of the servers relative to other servers. Step 401 may be performed by performing the method 300. At the end of the step 401, the servers in the rack are set to positions relative to other servers in sequential order: the topmost server is at position 1, the next server immediately below the topmost server is at position 2, the next server immediately below the server at position 2 is at position 3, etc.

In step 402, all non-server levels in the rack between two consecutive servers are identified. The non-server levels are levels that are empty or have non-server equipment, such as un-managed servers, power supplies, drive bays, etc. In one embodiment, the step 402 is performed by turning ON the UID lights of all the servers in the rack and measuring the distance between UID lights of two consecutive servers. Non-server levels may be identified based on the expected distance between UID lights of two servers that are immediately next to each other. If the distance between two consecutive servers is longer than the expected distance, a non-server level is presumed to be present between the two consecutive servers. Adjustments to distance measurements (e.g., +/−1 position) between consecutive servers may be made to compensate for UID lights that are not on the same spot on the servers (e.g., different brands, different models of the same brand, etc.).

Referring to rack 120-1 of FIG. 2 as an example, the non-server level 201-3 may be identified by measuring the distance between the UID light 211 of the server 210-2 at position 2 and the UID light 211 of the server 210-3 at position 3. In this example, the distance between the UID light 211 of the server 210-2 and the UID light 211 of the server 210-3 is longer than the expected distance between UID lights of servers that are immediately next to each other, which indicates presence of a non-server level between the servers 210-2 and 210-3.

In step 403, the relative positions of the servers are adjusted to take into account the identified non-server levels. Step 403 may be performed by adding the number of non-server levels to positions of servers that are below the non-server levels. The non-server levels may be set to previous positions of the re-positioned servers. As an example, if four non-server levels have been identified between a server at position 12 and a server at position 13 (i.e., between two consecutive servers), the server previously at position 13 is now set to position 17 (i.e., 4+13), the server previously at position 14 is set now to position 18, the server previously at position 15 is set now to position 19, etc. In that example, the identified four non-server levels are set to positions 13-16.

At the end of the method 400, servers and non-server levels are set to position 1, position 2, position 3, etc. in the rack. Referring to rack 120-1 of FIG. 2 as an example, the un-server 210-1 will be set to position 1, the server 210-2 will be set to position 2, the non-server level 201-3 will be set to position 3, the server 210-3 will be set to position 4, etc.

Figure 5:
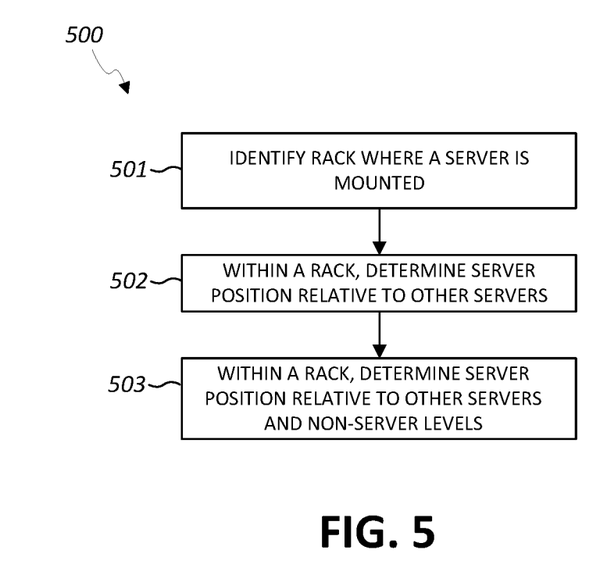
FIG. 5 shows a flow diagram of a method of determining positions of servers within a rack in accordance with yet another embodiment of the present invention.

FIG. 5 shows a flow diagram of a method 500 of determining positions of servers within a rack in accordance with an embodiment of the present invention. The method 500 is a multi-rack positioning method in that it determines a rack that contains a server and the position of the server within the rack.

In one embodiment, the method 500 is performed by the server position module 132 of the server manager 133. In the following steps, the server position module 132 sends signals to a server to turn that server's UID light ON or OFF. The server position module 132 receives image signals of a rack and servers mounted in the rack from a camera, and determines, from the image signals, the state of the UID lights of the servers. The server position module 132 also identifies, from the image signals, servers and non-server levels in a rack.

The server position module 132 further identifies, from the image signals, which rack a server is mounted. For example, a perimeter of each rack within the viewing angle of the camera may be defined by a bounding box, and a UID light of a server is turned ON or blinked ON and OFF to locate the server in a bounding box of a particular rack.

In step 501, the rack in which a server is mounted is identified. Step 501 may be performed by turning OFF the UID lights of all servers in all racks, identifying a perimeter of each rack, turning ON a UID light of a server, and identifying a perimeter that bounds the UID light of that server. Step 501 may also be performed by identifying a perimeter of each rack, blinking ON and OFF a UID light of a server, and identifying the perimeter that bounds the blinking UID light of that server.

In step 502, within a given rack, the position of each server relative to other servers in the rack is determined, as per the method 300.

In step 503, within a given rack, the position of each server relative to other servers and non-server levels in the rack are determined, as per the method 400.

In the methods 300, 400, and 500, the positions of servers and non-server levels within a rack are given in terms of sequential ordering, i.e., position 1, position 2, position 3, etc. The sequential ordering is not an actual measurement, i.e., not in terms of standard units of measurement, such as metric or imperial units of measurement. In some data centers with suitable equipment (e.g., high-resolution camera) and suitable image processing algorithm, actual measurements of positions of servers in a rack may be determined by turning ON the UID light of a server and measuring the distance to the UID light 211 from the top (or some other reference point) of the rack.

Figure 6:
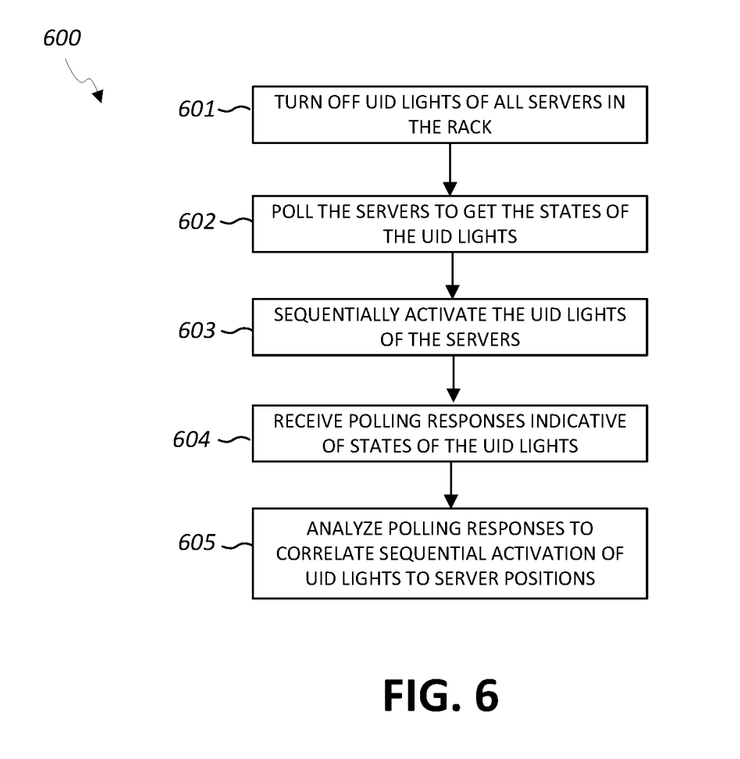
FIG. 6 shows a flow diagram of a method of determining positions of servers within a rack in accordance with yet another embodiment of the present invention.

FIG. 6 shows a flow diagram of a method 600 of determining positions of servers within a rack in accordance with an embodiment of the present invention. The method 600 is a relative positioning method, similar to the method 300, except that an image capturing device, such as a camera, is not required. The method 600 is suitable for use in data centers where image capture is not available or feasible. The method 600 may be performed using the server position module 132.

In step 601, the method 600 begins by turning OFF the UID lights of all servers that are mounted in a rack. The step 601 may be performed by manually deactivating all of the UID lights in the rack. The step 601 may also be performed by the server position module 132 sending electronic signals to the servers to turn OFF their UID lights. Because un-managed servers are not controllable by the server position module 132, the UID lights of un-managed servers may be manually turned OFF.

In step 602, the server position module 132 polls the servers to get the states of their corresponding UID lights. Because the UID lights have been turned OFF in step 601, the polling responses from the servers will indicate that all of the UID lights are turned OFF at the start of step 602. Polling the servers to get the states of the UID lights allows the server position module 132 to detect which UID light has been activated and in what order in the following step 603.

In step 603, the UID lights of the servers mounted in the rack are activated one at a time in sequential order, which in one embodiment is from top to bottom. In one embodiment, the UID lights are manually activated. For example, once the server position module 132 starts polling the servers, an IT person may start manually pushing the UID lights of the servers in the rack one at a time, in sequence from top to bottom. The sequential manual activation of the UID lights may be performed at a pace such that the polling properly detects the order the UID lights are activated.

In step 604, the server position module 132 receives, from the servers, polling responses indicative of the states of the UID lights.

In step 605, the server position module 132 analyzes the polling responses received from the servers to correlate the sequential activation of the UID lights in step 603 to server positions. The timestamps of UID light activation (from the polling responses) may be recorded by the server position module 132, and the positions of the servers may be set sequentially in timestamp order. For example, when a UID light of a server is activated, the ON state of the UID light will be reflected in the polling response returned by the server to the server position module 132. That server, identified by its server identifier, will be set to position 1. The next server whose UID light has been activated will reflect the ON state of its UID light in the polling response returned by that next server to the server position module 132. That next server, identified by its server identifier, is set to position 2, and so forth.

Knowledge of server positions facilitate physical inventory, physical deployment planning, change control, or other applications that may benefit from knowing the server positions. Embodiments of the present invention facilitate these applications because they allow for programmatic determination or programmatic-assisted determination of server positions. As can be appreciated, full manual determination of server positions is error-prone and very difficult in large data centers with many racks filled with servers. Server position determination is also not a one-time process, as it may have to be performed each time changes are made to server positions.

Figure 7:
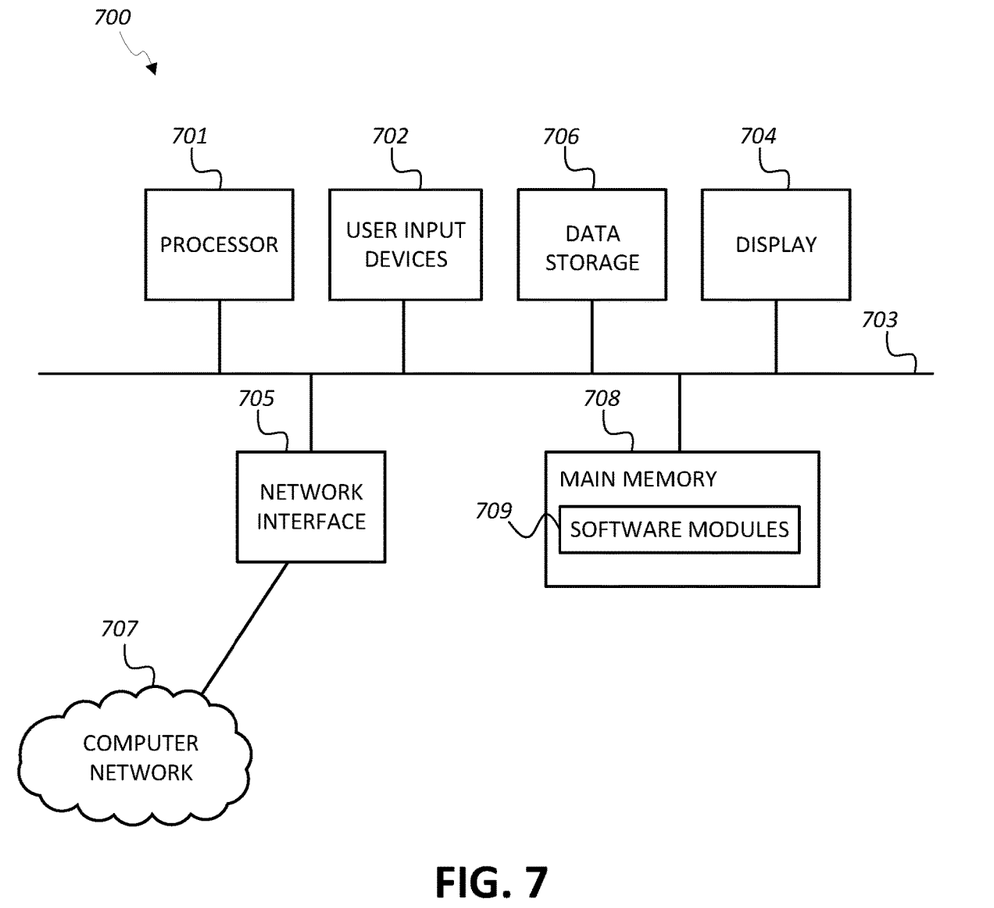
FIG. 7 shows a schematic diagram of a computer system that may be employed with embodiments of the present invention.

Referring now to FIG. 7, there is shown a schematic diagram of a computer system 700 that may be employed with embodiments of the present invention. The computer system 700 may be employed as a server management computer or other computer described herein. The computer system 700 may have fewer or more components to meet the needs of a particular application. The computer system 700 may include one or more processors 701. The computer system 700 may have one or more buses 703 coupling its various components. The computer system 700 may include one or more user input devices 702 (e.g., keyboard, mouse), one or more data storage devices 706 (e.g., hard drive, optical disk, solid state drive), a display screen 704 (e.g., liquid crystal display, flat panel monitor), a computer network interface 705 (e.g., network adapter, modem), and a main memory 708 (e.g., random access memory). The computer network interface 705 may be coupled to a computer network 707, which in this example includes the Internet.

The computer system 700 is a particular machine as programmed with one or more software modules 709, comprising instructions stored non-transitory in the main memory 708 for execution by the processor 701 to cause the computer system 700 to perform corresponding programmed steps. An article of manufacture may be embodied as computer-readable storage medium including instructions that when executed by the processor 701 cause the computer system 700 to be operable to perform the functions of the one or more software modules 709.

System and methods for determining positions of server computers within a rack have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system for determining positions of server computers within a rack, the system comprising:
   a camera that is positioned in front of a first rack, the first rack having a first set of server computers mounted therein; and
   a server management computer comprising at least one processor and a memory, the memory storing instructions that when executed by the at least one processor cause the server management computer to:
   receive image signals from the camera;
   turn OFF Unit Identification (UID) lights of the first set of server computers;
   send an electronic signal to a first server computer of the first set of server computers to turn ON a UID light of the first server computer;
   set the first server computer to a topmost position in the first rack;
   send an electronic signal to a second server computer of the first set of server computers to turn ON a UID light of the second server computer;
   process the image signals received from the camera to detect the turning ON of the UID light of the second server computer to determine a position of the second server computer relative to other server computers of the first set of server computers;
   when the second server computer is above all known server computers of the first set of server computers, set the second server computer to the topmost position and increment positions of all the known server computers, wherein a known server computer is a server computer that has been set to a corresponding position in the first rack;
   when the second server computer is below all the known server computers of the first set of server computers, set the second server computer to a bottom most position in the first rack; and
   when the second server computer is between two consecutive known server computers of the first set of server computers, set the second server computer to a position that is equal to a position of a lower server computer among the two consecutive known server computers, and increment positions of all known server computers that are below the second server computer.

2. The system of claim 1, wherein the instructions stored in the memory, when executed by the at least one processor, cause the server management computer to:
   process the image signals to identify non-server levels in the first rack, each of the non-server levels being an empty level or a level containing a non-server equipment.

3. The system of claim 2, further comprising:
   adjusting positions of the first set of server computers based on the identified non-server levels in the first rack.

4. The system of claim 1, wherein the instructions stored in the memory, when executed by the at least one processor, cause the server management computer to:
   send an electronic signal to a particular server computer of the first set of server computers or of a second set of server computers to turn ON a UID light of the particular server computer, the second set of server computers being mounted in a second rack;
   from the image signals received from the camera, identify the particular server computer to be within a perimeter of the second rack; and
   in response to identifying the particular server computer to be within the perimeter of the second rack, detect that the particular server computer is mounted in the second rack.

5. A method of determining positions of server computers within a rack, the method comprising:
   using a camera to capture images of a first rack, the first rack having a first set of server computers mounted therein;
   turning OFF Unit Identification (UID) lights of the first set of server computers;
   sending an electronic signal to a first server computer of the first set of server computers to turn ON a UID light of the first server computer;
   setting the first server computer to a topmost position in the first rack;
   sending an electronic signal to a second server computer of the first set of server computers to turn ON a UID light of the second server computer;
   programmatically processing image signals from the camera to detect the turning ON of the UID light of the second server computer to determine a position of the second server computer relative to other server computers of the first set of server computers;
   when the second server computer is above all known server computers of the first set of server computers, setting the second server computer to the topmost position and incrementing positions of all the known server computers, wherein a known server computer is a server computer that has been set to a corresponding position in the first rack;

when the second server computer is below all the known server computers of the first set of server computers, setting the second server computer to a bottom most position in the first rack; and when the second server computer is between two consecutive known server computers of the first set of server computers, setting the second server computer to a position that is equal to a position of a lower server computer among the two consecutive known server computers, and incrementing positions of all known server computers that are below the second server computer.

6. The method of claim 5, further comprising:

programmatically processing the image signals from the camera to identify non-server levels in the first rack, wherein a non-server level is an empty level or a level containing a non-server equipment.

7. The method of claim 6, further comprising:

adjusting positions of the first set of server computers based on the identified non-server levels in the first rack.

8. The method of claim 5, further comprising:

turning ON a UID light of a particular server computer of the first set of server computers or of a second set of server computers, the second set of server computers being mounted in a second rack;

programmatically processing the image signals from the camera to identify the particular server computer within a perimeter of the second rack; and in response to identifying the particular server computer within the perimeter of the second rack, detecting that the particular server computer is mounted in the second rack.

9. A method of determining positions of server computers within a rack, the method comprising:

sending electronic signals to poll a plurality of server computers mounted in a rack for states of corresponding Unit Identification (UID) lights of the plurality of server computers;

sequentially activating the UID lights of the plurality of server computers;

receiving, from the plurality of server computers, polling responses that indicate the states of the corresponding UID lights of the plurality of server computers; and analyzing the polling responses to correlate the sequential activation of the UID lights of the plurality of server computers to positions of the plurality of server computers in the rack.

10. The method of claim 9, wherein analyzing the polling responses comprises:

setting positions of the plurality of servers in the rack in sequential order based on timestamps of activation of the UID lights of the plurality of server computers.

* * * * *